UNITED STATES PATENT OFFICE.

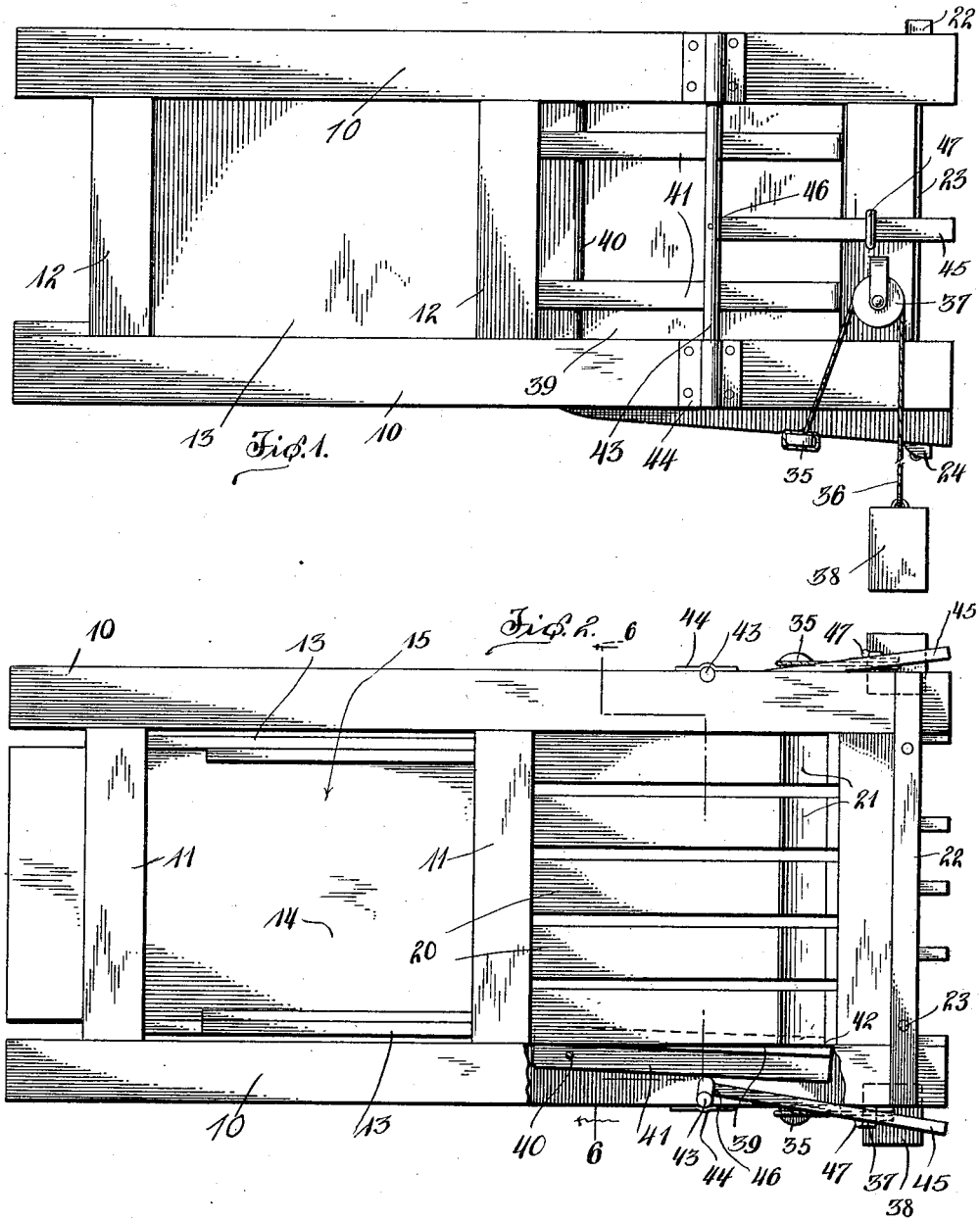

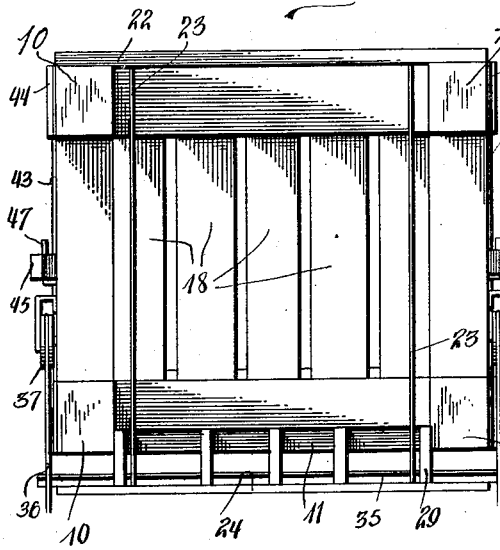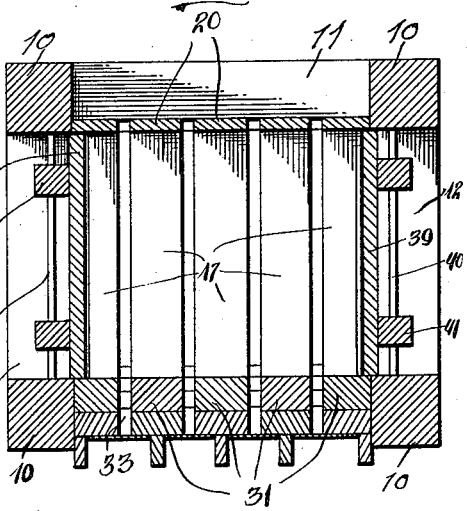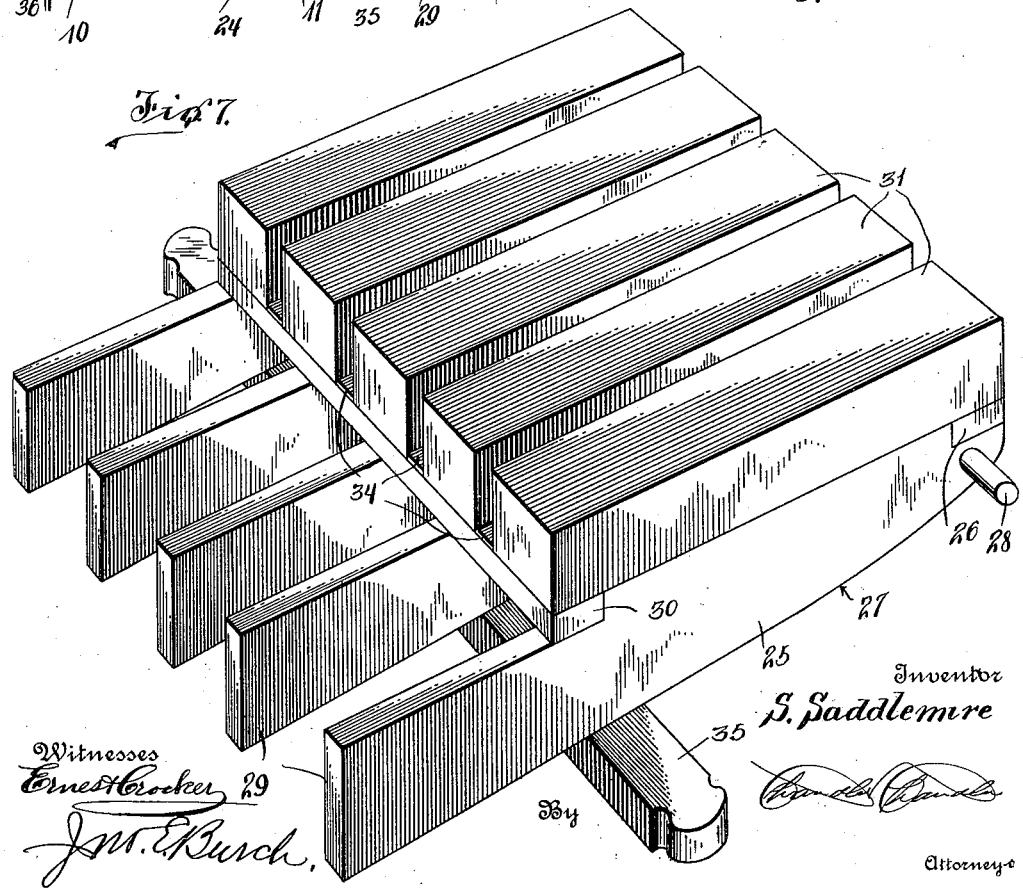

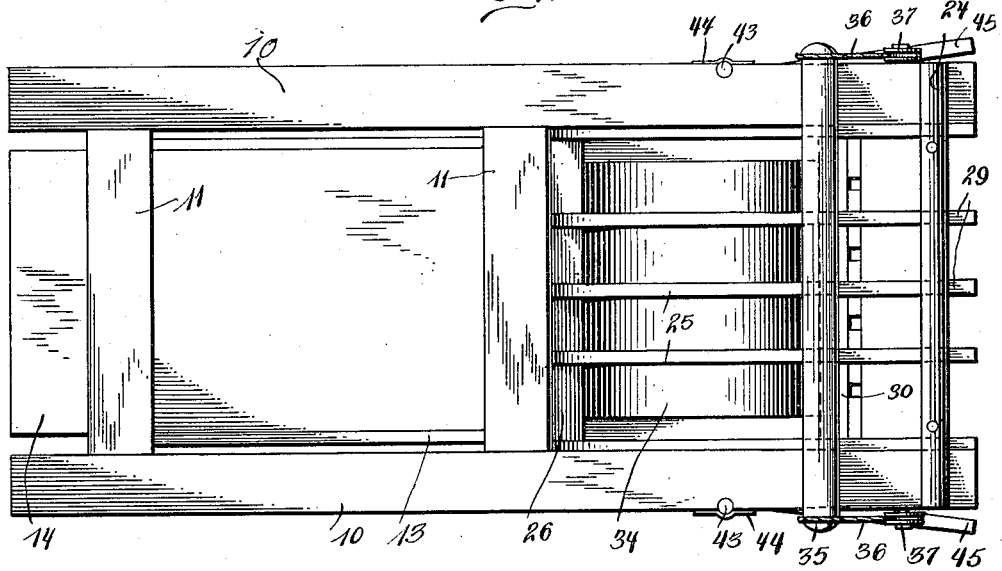
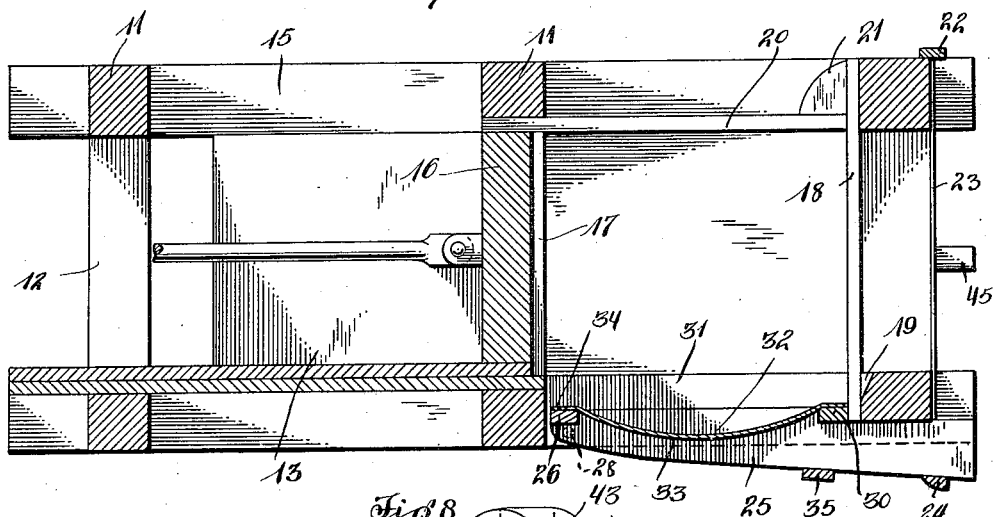

SHERIDAN SADDLEMIRE, OF KNOX, NEW YORK.

BALING-PRESS.

1,033,829.  Specification of Letters Patent. Patented July 30, 1912.

Application filed September 11, 1911. Serial No. 648,691.

*To all whom it may concern:*

Be it known that I, SHERIDAN SADDLE-MIRE, a citizen of the United States, residing at Knox, in the county of Albany, State of New York, have invented certain new and useful Improvements in Baling-Presses; and I do hereby declare the following to be a full, clear, and exact description of the invention, such as will enable others skilled in the art to which it appertains to make and use the same.

This invention relates to new and useful improvements in baling presses and more especially to an improved baling chamber therefor and the principal object of the invention is to provide novel means for discharging a bale of hay or the like after the same has been tied.

Another object of the invention is to provide an improved discharge door opening downwardly adapted to be opened by the weight of the bale when tied or when completed and which can be regulated to operate under a predetermined weight according to the materials baled within the press and to provide means for returning the door to a closed position after the bale has been discharged.

Another and important object of the invention is to provide the baling chamber with relief doors at the side portions thereof adapted to take the strain of the end portions of the bales when the ties are made therearound to deliver the bales broadside and thus permit the discharge of the bale without the necessity of assisting in its withdrawal.

With the above and other objects in view the invention consists of certain other combinations and arrangements of parts as will be hereinafter more fully described and claimed, it being a still further object of the invention to provide a device which will not be likely to get out of working order.

In the drawings:—Figure 1 is a side elevation of a baling press constructed in accordance with my invention with the doors in a closed position. Fig. 2 is a top plan view thereof. Fig. 3 is a front elevation of the device. Fig. 4 is a bottom plan view of the device in a closed position. Fig. 5 is a central longitudinal sectional view of the press with the doors in a closed position. Fig. 6 is a sectional view on the line 6—6 of Fig. 2. Fig. 7 is a detail perspective view of the bottom or discharge door. Fig. 8 is a detail view of one of the closing members for the side doors.

Referring to the drawings in detail, there is shown the frame of a baling press which comprises the four (4) longitudinal bars 10 which are connected at spaced distances along their lengths by the transverse bars 11, said latter bars being connected to the longitudinal bars while vertical side bars 12 are also connected to the longitudinal bars in alinement with and adjacent to the transverse bars at the upper and lower sides of the rectangular frame thus formed and it will also be seen that the longitudinal bars extend beyond the vertical side bars and the transverse bars at their end portions. Side walls 13 and a bottom wall 14 are secured to the interior faces of the said bars at one end of the frame to provide an open top 15 around which a suitable hopper (not shown) may be secured for feeding the hay or the like into the press and a plunger 16 operates within the walled portion of the frame and may be reciprocated by any suitable operating mechanism (not shown). The end portion of the plunger at its compression side is provided with spaced vertical slats 17 providing intermediate spaces through which the bale ties are disposed in a manner to be hereinafter more fully described.

The frame beyond the plunger chamber or walled portion is provided with a baling chamber and has its end wall closed by a series of vertical spaced slats 18 and the lower transverse bar is formed with beveled cut away portions 19 for the entrance of the bale tie while the upper portion of the chamber is similarly closed by slats 20 similarly spaced from each other to provide intermediate openings and in practice, the slats 18 are preferably secured throughout the height of the frame and to the inner face of the upper and lower transverse bars while the slats 20 are secured to the inner face of the centralmost transverse bar and to the inner faces of the slats 18 and may be braced by block members 21. A cross bar 22 is connected to the upper faces of the projecting portions of the upper longitudinal bars and has a pair of cables 23 connected thereto and slightly spaced from the inner faces of the said bars for supporting a locking bar 24 at their lower ends to engage beneath the discharge door and hold it in a closed position as will be hereinafter more clearly set forth.

The discharge door above mentioned is mounted in the lower portion of the baling chamber and comprises a series of longitudinal strips 25 spaced apart and connected at their inner ends by a cross strip 26 seated in rabbeted corners of said longitudinal strips and said latter strips are also curved upon their under edges as shown at 27 in Fig. 7 of the drawings to permit movement thereof upon pivot members 28 extending through the outer longitudinal strips and the lower longitudinal bars. The said longitudinal strips are formed at their outer ends with reduced portions 29 providing handles for manipulating the door if desired and also to permit the door to move to a closed position in alinement with the bottom wall of the plunger chamber for the proper baling or compression of the hay or the like. A cross strip 30 also connects the longitudinal strips 25 in a similar manner as the cross strips 26 except that the strip 30 is disposed adjacent to the point of formation of the reduced portions 29 flooring strips 31 are mounted upon the cross strips 26 and 30 and spaced apart in a similar manner as the slats 18 and 20 and adapted to form intermediate slots or openings for the passage of the ties. Spacer strips 32 having curved underfaces, are secured to the underfaces and adjacent to the edge portions of the flooring strips 31 at the openings formed therebetween and are adapted for securing metallic plates 33 upon their curved portions while said metallic plates have tongue extensions 34 extending between the end portions of the flooring strips and secured to the upper faces of the cross strips 26 and 30 so that as the wires are disposed through the openings in the front slats 18 through the medium of the beveled or cut away portions 19, the said wires will be guided by the plates beneath the bale and upwardly between the slats 17 carried by the plunger and the opposite ends of the wire forming the ties may be brought together and united, thus greatly facilitating the binding operation. The locking bar 24 as will be clearly seen from the drawings is adapted to engage beneath the reduced portions 29 and to hold the discharge door at the bottom of the chamber in a closed position when the press is not in use.

When the press is in use, it is adapted to permit the automatic discharge of the bales under their weight and it is of course understood that the locking bar 24 is removed from under the reduced portions 29 when the press is in use and in order to permit such movement of the discharge door and to return said door to a raised or closed position, a cross bar 35 is connected to the under edges of the strips 25 inwardly of their ends and adjacent to the point of formation of the reduced portions 29, the end portions of said cross bar projecting below the lower longitudinal bars and having cables 36 connected thereto and passed over pulleys 37 rotatably journaled upon the outer faces of the vertical side bars at one end of the frame while adjustable weight members 38 are mounted upon the free ends of the cables which depend from the pulleys, it being obvious that the weights serve to raise the door but are also regulated so as to permit the weight of the bale to overcome their weight and be discharged when the bale is completed. The desired weight carried by the cables can be readily ascertained in practice and varied at will.

From the foregoing description, it will be seen that the bales are tied broadside and to be discharged in this manner in order to permit the bales to be positively discharged and to lessen the friction upon the end portions thereof, relief doors 39 are mounted at the side portions of the baling chamber upon vertical pivot rods 40 mounted in the upper and longitudinal bars and extended through brace members 41 provided upon the door while the free end portions and inner faces of the said doors 39 are reduced in thickness by rabbeted portions 42 to engage the adjacent edges of the slats 18 when the doors are in their normal position slightly converging from the side walls 13 of the plunger chamber toward the discharge end of the press.

Eccentric rods 43 are rotatably mounted at their upper and lower ends in the longitudinal bars of the frame by means of bearing straps 44 and their eccentric extensions are provided with rounded faces adapted to engage the brace members 41 when the said eccentric rods are moved into engagement therewith so as to hold the relief or side doors 39 in a closed position during the baling operation of the press. In order to operate these eccentric rods, levers 45 are pivotally connected for limited vertical movement in slots centrally of the heights of the rods as shown at 46 and when engaged with angular keepers 47 projecting from the vertical end bars of the frame serve to retain the said rods in position to hold the compression doors closed and when disengaged from said keepers and swung outwardly, the eccentric enlargements of the rods 43 are disengaged from the brace members 41 to permit expansion of the side or relief doors and thereby permit the discharge of the bale without friction at its ends.

It will thus be seen that a baling press is provided which will be found very desirable in use by reason of the automatic discharging of the bales and which will avoid the usual necessity of having to lift the same from the press and the automatic return of the door to a closed position also obviates the necessity of providing an attendant for the discharge end of the press for closing the door although the most objectionable feature or former device is the necessity of lifting the bales from the press.

I claim:—

1. In a baling chamber, a frame, a closed end and top wall for the frame, a downwardly movable discharge door for the frame, means to automatically return said door to a raised position and means adapted to engage the door to hold the same in a stationary position, said last mentioned means holding the returning means inoperative.

2. In a baling press, the combination with a frame thereof and a plunger movable therein; of a discharge door for the frame for automatically discharging the bale when completed, and means for automatically returning said door to a closed position.

3. In a baling press, the combination with a frame thereof having a plunger chamber and a baling chamber; of a plunger reciprocable in the plunger chamber, a discharge door pivoted to the bottom portion of the baling chamber to be automatically opened by the weight of the bale therein and directly discharge the bale from the press and means for holding the door closed, said means being suspended from the upper part of the frame.

4. A press comprising a frame, a plunger movable in the frame for compressing the materials therein and a discharge door for the frame, said door being adapted to deflect tie wires around the bale formed in the press.

5. In a press, longitudinal bars, connecting members for said bars, a plunger chamber formed at one end of the press and having side walls secured to said bars and a bottom wall supported thereby, a plurality of spaced slats closing the top and end opposite to the plunger chamber to form a baling chamber, a plunger having similarly spaced slats, a discharge door pivotally connected to the lower longitudinal bars, a curved bottom for the latter door and slats mounted thereon and spaced apart in a similar manner as the aforesaid slats to receive the wires guided therebetween.

6. In a press, a frame having its end portion closed against the discharge of a bale compressed therein, a discharge door at the bottom of the chamber adapted to automatically discharge the bale therefrom when completed, said door being pivoted at its inner end to the frame and comprising spaced longitudinal cross strips connecting the same, said longitudinal strips having arcuate recesses in their upper portions, metallic plates secured to said arcuate portions, spacer strips securing said plates in position and flooring strips secured over said longitudinal strips, said plates serving to deflect wires around a bale compressed in the chamber.

7. In a press, a frame having a baling chamber, a discharge door for the chamber, relief doors for the sides of the chamber, vertical pivots, eccentric rods vertically supported in the frame outwardly of said doors, means carried by the rods to hold the same in contact with the relief doors to hold the latter toward the baling chamber and adapted when relieved to permit the doors to move outwardly under the pressure of the bale therein to assist in the free discharge of the bale and weight means for holding the discharge door closed.

In testimony whereof, I affix my signature, in presence of two witnesses.

SHERIDAN SADDLEMIRE.

Witnesses:
LEROY YOUNGS,
AMAZIAH SADDLEMIRE.

---

Copies of this patent may be obtained for five cents each, by addressing the "Commissioner of Patents, Washington, D. C."